United States Patent
Hsieh et al.

(10) Patent No.: US 9,230,074 B2
(45) Date of Patent: Jan. 5, 2016

(54) METHOD FOR SWITCHING WALLPAPER IN SCREEN LOCK STATE, MOBILE ELECTRONIC DEVICE THEREOF, AND STORAGE MEDIUM THEREOF

(75) Inventors: Chin-Ying Hsieh, Taoyuan County (TW); Sih-Jie Gu, Taoyuan County (TW); Drew Bamford, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 1271 days.

(21) Appl. No.: 12/353,261

(22) Filed: Jan. 14, 2009

(65) Prior Publication Data
US 2009/0259968 A1 Oct. 15, 2009

(30) Foreign Application Priority Data
Apr. 15, 2008 (TW) ................................ 97113619 A

(51) Int. Cl.
G06F 21/31 (2013.01)
H04M 1/67 (2006.01)
H04M 1/677 (2006.01)
H04M 1/725 (2006.01)

(52) U.S. Cl.
CPC ................. *G06F 21/31* (2013.01); *H04M 1/67* (2013.01); *H04M 1/677* (2013.01); *H04M 1/72544* (2013.01); *H04M 2250/22* (2013.01)

(58) Field of Classification Search
CPC ............... G06F 2203/04802; G06F 1/3265; G06F 1/32; G06F 21/31; H04M 1/66; H04M 1/667; H04M 1/67; H04M 1/673; H04M 1/677; H04M 1/72544; H04M 2250/22
USPC .................................. 715/741, 863, 864, 867
See application file for complete search history.

(56) References Cited

U.S. PATENT DOCUMENTS

| | | | | |
|---|---|---|---|---|
| 5,678,015 A * | 10/1997 | Goh | ................................ | 715/782 |
| 5,724,492 A * | 3/1998 | Matthews et al. | ............. | 345/419 |
| 5,767,854 A * | 6/1998 | Anwar | ........................... | 715/848 |
| 6,202,083 B1 * | 3/2001 | Chrabaszcz | ................... | 709/203 |
| 6,556,225 B1 * | 4/2003 | MacPhail | ....................... | 715/848 |
| 6,618,038 B1 * | 9/2003 | Bohn | ........................... | 345/164 |

(Continued)

FOREIGN PATENT DOCUMENTS

| | | |
|---|---|---|
| WO | 2006084759 | 8/2006 |
| WO | 2008030794 | 3/2008 |
| WO | 2008030879 | 3/2008 |

OTHER PUBLICATIONS

"Office Action of Taiwan Counterpart Application", issued on Jul. 13, 2011, p. 1-p. 7.

(Continued)

*Primary Examiner* — Eric Wiener
(74) *Attorney, Agent, or Firm* — Jianq Chyun IP Office

(57) ABSTRACT

A method for switching wallpaper in screen lock state, a mobile electronic device thereof, and a storage medium thereof are provided. In the present method, an input signal is received by a touch screen when a mobile electronic device enters a screen lock state. Then, whether the input signal is located in a specific area of the touch screen is determined. A moving track of the input signal is detected if the input signal is located in the specific area. Finally, wallpaper of the screen lock state is switched according to the moving track. As a result, a user can switch wallpaper arbitrarily even if the mobile electronic device is in the screen lock state, so as to increase convenience of switching wallpaper.

17 Claims, 3 Drawing Sheets

(56) References Cited

U.S. PATENT DOCUMENTS

| | | | |
|---|---|---|---|
| 6,690,387 B2 | 2/2004 | Zimmerman et al. | |
| 6,903,743 B2* | 6/2005 | Ng | 345/473 |
| 6,938,218 B1* | 8/2005 | Rosen | 715/850 |
| 7,134,095 B1* | 11/2006 | Smith et al. | 715/860 |
| 7,231,231 B2 | 6/2007 | Kokko et al. | |
| 7,657,849 B2* | 2/2010 | Chaudhri | G06F 3/04883 345/173 |
| 7,685,534 B2* | 3/2010 | Kamen et al. | 715/848 |
| 7,800,633 B2* | 9/2010 | Seo | 345/629 |
| 8,365,099 B2* | 1/2013 | Cho | G06F 3/0483 455/95 |
| 8,390,566 B2* | 3/2013 | Hullot | 345/156 |
| 9,015,640 B2* | 4/2015 | de Leon | G06F 3/017 345/173 |
| 2002/0060701 A1* | 5/2002 | Naughton et al. | 345/853 |
| 2003/0169306 A1* | 9/2003 | Makipaa et al. | 345/864 |
| 2004/0049419 A1 | 3/2004 | Knight | |
| 2004/0049533 A1* | 3/2004 | Knight | 709/203 |
| 2004/0075701 A1* | 4/2004 | Ng | 345/867 |
| 2004/0085351 A1 | 5/2004 | Tokkonen | |
| 2004/0095346 A1 | 5/2004 | Tomita | |
| 2004/0125081 A1* | 7/2004 | Hayakawa | G06F 3/04847 345/156 |
| 2005/0060554 A1* | 3/2005 | O'Donoghue | G06F 21/36 713/183 |
| 2005/0108751 A1* | 5/2005 | Dacosta | 725/39 |
| 2005/0114800 A1 | 5/2005 | Rao | |
| 2005/0124389 A1* | 6/2005 | Yang | 455/574 |
| 2005/0153817 A1 | 7/2005 | Fogarty | |
| 2006/0217160 A1* | 9/2006 | Lee | H04M 1/72544 455/566 |
| 2006/0274060 A1* | 12/2006 | Ni et al. | 345/419 |
| 2007/0018957 A1* | 1/2007 | Seo | H04M 1/12 345/156 |
| 2007/0028176 A1 | 2/2007 | Perdomo et al. | |
| 2007/0036346 A1* | 2/2007 | Kwon | G06F 3/0482 379/413 |
| 2007/0052725 A1* | 3/2007 | Ostojic et al. | 345/625 |
| 2007/0070076 A1* | 3/2007 | Foxenland | G09G 5/00 345/581 |
| 2007/0091180 A1* | 4/2007 | Han | G06F 3/04842 348/207.99 |
| 2007/0146325 A1* | 6/2007 | Poston et al. | 345/163 |
| 2007/0150826 A1 | 6/2007 | Anzures et al. | |
| 2007/0150842 A1* | 6/2007 | Chaudhri | G06F 3/04883 715/863 |
| 2007/0171236 A1* | 7/2007 | Perttula | G06F 3/04817 345/619 |
| 2007/0183381 A1* | 8/2007 | Seo | H04M 1/72544 370/338 |
| 2007/0195105 A1* | 8/2007 | Koberg | H04M 1/72544 345/582 |
| 2007/0257920 A1* | 11/2007 | Neider et al. | 345/473 |
| 2007/0276795 A1 | 11/2007 | Poulsen | |
| 2007/0278320 A1 | 12/2007 | Lunacek et al. | |
| 2007/0296552 A1* | 12/2007 | Huang et al. | 340/10.5 |
| 2007/0296738 A1* | 12/2007 | Louch | G06Q 99/00 345/634 |
| 2008/0005698 A1* | 1/2008 | Koskinen | G06F 3/0481 715/835 |
| 2008/0052945 A1 | 3/2008 | Matas et al. | |
| 2008/0057941 A1* | 3/2008 | Scott et al. | 455/425 |
| 2008/0082930 A1 | 4/2008 | Omernick et al. | |
| 2008/0106531 A1* | 5/2008 | Hullot | 345/204 |
| 2008/0108299 A1* | 5/2008 | Hullot | H04M 1/72544 455/3.01 |
| 2008/0125179 A1* | 5/2008 | Hamada | H04M 1/72522 455/566 |
| 2008/0174427 A1* | 7/2008 | Banerjee et al. | 340/541 |
| 2008/0195961 A1* | 8/2008 | Bae et al. | 715/769 |
| 2008/0220816 A1* | 9/2008 | Ryu et al. | 455/556.1 |
| 2009/0061837 A1* | 3/2009 | Chaudhri et al. | 455/418 |
| 2009/0153289 A1* | 6/2009 | Hope et al. | 340/5.1 |
| 2009/0158222 A1* | 6/2009 | Kerr et al. | 715/867 |
| 2009/0165145 A1* | 6/2009 | Haapsaari et al. | 726/28 |
| 2009/0322676 A1* | 12/2009 | Kerr et al. | 345/158 |
| 2010/0016003 A1* | 1/2010 | Shapiro et al. | 455/466 |
| 2010/0075649 A1* | 3/2010 | Teng | 455/418 |

OTHER PUBLICATIONS

"Notice of Allowance of Japan counterpart application", issued on Nov. 29, 2013, p. 4.

* cited by examiner

METHOD FOR SWITCHING WALLPAPER IN SCREEN LOCK STATE, MOBILE ELECTRONIC DEVICE THEREOF, AND STORAGE MEDIUM THEREOF

CROSS-REFERENCE TO RELATED APPLICATION

This application claims the priority benefit of Taiwan application serial no. 97113619, filed on Apr. 15, 2008. The entirety of the above-mentioned patent application is hereby incorporated by reference herein and made a part of specification.

BACKGROUND OF THE INVENTION

1. Field of the Invention

The present invention relates to a method for switching wallpaper of a mobile electronic device. More particularly, the present invention relates to a method for switching wallpaper in a screen lock state, a mobile electronic device thereof, and a storage medium thereof.

2. Description of Related Art

With development of technology, only integrating multiple functions to an electronic device cannot satisfy demands of customers. Besides a slim and elegant profile, operation convenience of the electronic device with multiple functions is also required, so as to cope with increasingly stringent requirements of the customers. Taking a widely used mobile phone as an example, a hardware keyboard is conventionally applied to function as an input interface thereof. However, since a touch screen has features of convenient utilization, intuitive operation, durability and low cost, etc., the hardware keyboard is then replaced by the touch screen, and accordingly operation convenience of the mobile phone is improved.

Though it is convenient to operate the mobile phone via the touch screen, manufacturers of the mobile phones have to develop a mechanism for preventing unintended touch of the touch screen, so as to prevent activation of an unintended function caused by unintended touch of the touch screen. In other words, when the mobile phone is not operated, it may be automatically set to a screen lock state, so as to turn off an input function of the touch screen. Such mechanism is essential when the mobile phone is put into a pocket or a bag. Once the mobile phone is set to the screen lock state, misdialing of the mobile phone then may be avoided.

For some mobile phones in the market, the input function of the touch screen thereof is directly turned off once the mobile phone is set to the screen lock state. However, since an image displayed thereon under the screen lock state is the same to a general operation interface, the mobile phone then may be regarded as being non-operational due to no response to operations. For some other mobile phones, a predetermined wallpaper is displayed thereon when the mobile phone enters the screen lock state, and the wallpaper is probably a blank pattern and cannot be arbitrarily changed under the screen lock state. Namely, when the mobile phone is in the screen lock state, basic information such as time, etc. then cannot be displayed, and only when the screen is unlocked, may the user check the time displayed thereon. Therefore, such operation method is inconvenient.

SUMMARY OF THE INVENTION

Accordingly, the present invention is directed to a method for switch wallpaper in a screen lock state, by which when a mobile electronic device is in a screen lock state, wallpapers thereof may still be arbitrarily changed.

The present invention is directed to a mobile electronic device, which may switch different wallpapers according to a sliding operation of a user performed on a touch screen thereof after the mobile electronic device enters a screen lock state.

The present invention provides a method for switching wallpaper in a screen lock state, which is adapted to a mobile electronic device having a touch screen. The method may be described as follows. First, the mobile electronic device enters the screen lock state. Next, an input signal is received via a touch screen, and whether or not the input signal is located in a specific area of the touch screen is judged. Next, a moving track of the input signal is detected if the input signal is located in the specific area. Finally, wallpaper of the screen lock state is switched and displayed according to the moving track.

In an embodiment of the present invention, the method further includes providing at least one candidate wallpaper, and the candidate wallpapers are arranged in a sequence according to picture information thereof. Wherein, the picture information at least includes picture size, filing time of the picture and picture name, etc.

In an embodiment of the present invention, method of switching the wallpaper of the screen lock state according to the moving track includes following steps. First, a moving direction of the moving track is obtained. Next, the candidate wallpapers are sequentially switched and displayed on the touch screen according to the moving direction, so as to display the wallpaper of the screen lock state.

In an embodiment of the present invention, method of sequentially switching and displaying the candidate wallpapers on the touch screen includes the following steps. First, a first plane of a 3D motion user interface is displayed on the touch screen, wherein one of the candidate wallpapers is displayed in the first plane. Next, according to the sequence of the candidate wallpapers arranged based on the picture information thereof, the next candidate wallpaper is displayed on a second plane of the 3D motion user interface, wherein the first plane and the second plane are two adjacent planes of the 3D motion user interface. Finally, an axial rotation is processed on the 3D motion user interface according to the moving direction, so as to switch the first plane to the second plane.

In an embodiment of the present invention, the 3D motion user interface is a polyhedron or a cube, and the axial rotation of the 3D motion user interface at least includes one of a rotation along an X axis, a rotation along a Y axis and a rotation along a slanted lt axis.

In an embodiment of the present invention, the specific area includes a wallpaper displaying area of the touch screen.

In an embodiment of the present invention, after the step of switching and displaying the wallpaper, a present time is further displayed in a time displaying area of the touch screen, wherein the time displaying area partially covers the wallpaper displaying area.

The present invention provides a mobile electronic device including a screen lock state switching module, a touch screen and a processing module. The screen lock state switching module is used for switching the mobile electronic device to a screen lock state. The touch screen is coupled to the screen lock state switching module, and is used for receiving an input signal in the screen lock state. The processing module is coupled to the touch screen, and is used for judging whether or not the input signal is located in a specific area of the touch screen, and detecting a moving track of the input signal if the input signal is located in the specific area, and switching the wallpaper of the screen lock state according to the moving track.

In an embodiment of the present invention, the mobile electronic device further includes a storage unit connecting the processing module, which is used for storing at least one candidate wallpaper. Wherein, the candidate wallpapers are arranged in a sequence according to picture information thereof. The picture information at least includes one of picture size, filing time of the picture and picture name, etc.

In an embodiment of the present invention, the processing module is used for obtaining a moving direction of the moving track, and sequentially switching and displaying the candidate wallpapers on the touch screen, so as to display the wallpaper of the screen lock state.

In an embodiment of the present invention, the processing module is used for displaying a first plane of a 3D motion user interface on the touch screen, wherein one of the candidate wallpapers is displayed in the first plane. Next, according to the sequence of the candidate wallpapers arranged based on the picture information thereof, the processing module displays the next candidate wallpaper on a second plane of the 3D motion user interface, wherein the first plane and the second plane are two adjacent planes of the 3D motion user interface. Finally, the processing module processes an axial rotation on the 3D motion user interface according to the moving direction, so as to switch the first plane to the second plane.

In an embodiment of the present invention, the 3D motion user interface is a polyhedron or a cube, and axial rotation of the 3D motion user interface at least includes one of a rotation along an X axis, a rotation along a Y axis and a rotation along a slanted axis.

In an embodiment of the present invention, the specific area includes a wallpaper displaying area of the touch screen.

In an embodiment of the present invention, the processing module is used for displaying a present time in a time displaying area of the touch screen, wherein the time displaying area partially covers the wallpaper displaying area.

The present invention provides a storage medium for storing a computer program. The computer program includes a plurality of program codes that may be loaded to a mobile electronic device, so that the mobile electronic device may execute the aforementioned method for switching wallpaper in the screen lock state.

According to the present invention, after the mobile electronic device enters the screen lock state, a sliding operation of a user performed on the specific area of the touch screen is then obtained. Then, different wallpapers are switched according to the moving track generated based on the sliding operation, so that the user may conveniently switch the wallpapers, and operation fun and convenience thereof are improved.

In order to make the aforementioned and other objects, features and advantages of the present invention comprehensible, a preferred embodiment accompanied with figures is described in detail below.

DESCRIPTION OF EMBODIMENTS

To fully convey the spirit of the present invention, embodiments are provided for describing the present invention in detail.

Figure 1:
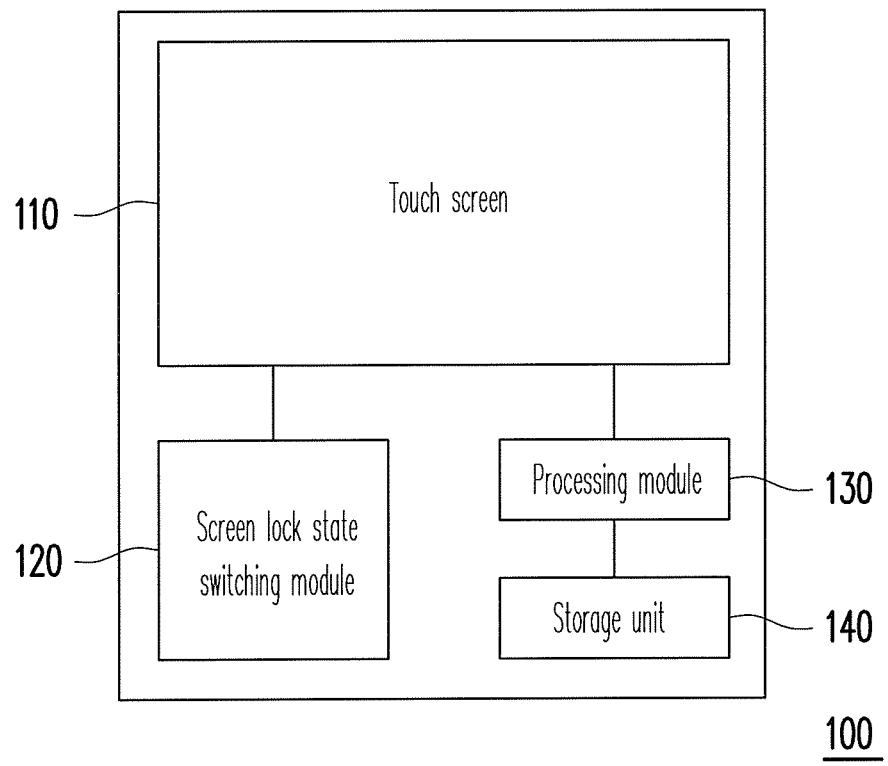
FIG. 1 is a block diagram illustrating a mobile electronic device according to an embodiment of the present invention.

FIG. 1 is a block diagram illustrating a mobile electronic device according to an embodiment of the present invention. Referring to FIG. 1, the mobile electronic device 100 includes a touch screen 110, a screen lock state switching module 120, a processing module 130 and a storage unit 140. In the present embodiment, the mobile electronic device may be a mobile phone, a personal digital assistant (PDA) or a smart phone, etc., which is not limited by the present invention.

The touch screen 110 is not only used for displaying operation frames of various application programs performed by the mobile electronic device 100, but is also used for receiving an input signal generated when a user touches the touch screen 110, so that the touch screen 110 may simultaneously function as an input interface and an output interface of the mobile electronic device 100.

The screen lock state switching module 120 is coupled to the touch screen 110. The mobile electronic device 100 may be switched to a screen lock state via the screen lock state switching module 120, so as to avoid accidentally activating functions of the mobile electronic device 100.

The processing module 130 is coupled to the touch screen 110. When the touch screen 110 receives the input signal while the mobile electronic device 100 enters the screen lock state, the processing module 130 first judges whether or not the input signal is located in a specific area of the touch screen 110, and detects a moving track of the input signal if the input signal is located in the specific area, and then switches and displays the wallpaper of the screen lock state according to the moving track.

The storage unit 140 is coupled to the processing module 130, and is used for storing a plurality of candidate wallpapers arranged in a sequence according to specific picture information. In the present embodiment, the picture information may be picture size, filing time of the picture or picture name, etc., which is not limited by the present invention.

Figure 2:
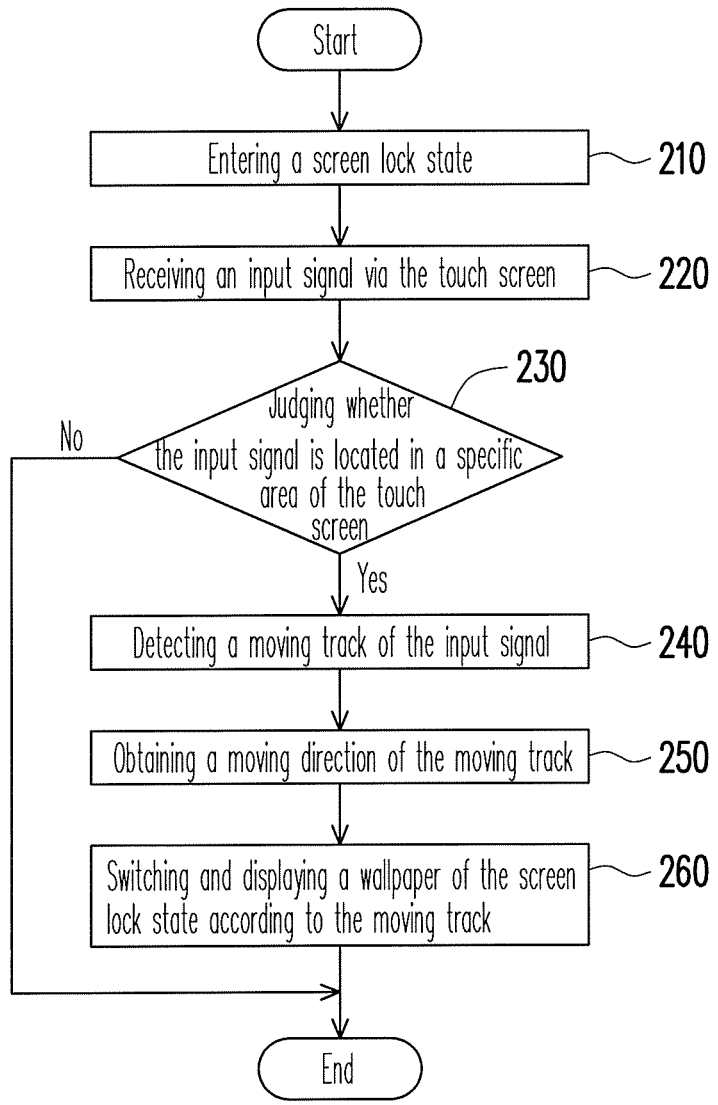
FIG. 2 is a flowchart illustrating a method for switching wallpaper in a screen lock state according to an embodiment of the present invention.

In the following content, the mobile electronic device 100 is taken as an example for describing steps of switching the wallpapers in the screen lock state. Wherein, a plurality of the candidate wallpapers with a sequence arranged based on the picture information is pre-stored in the storage unit 140 of the mobile electronic device 100. FIG. 2 is a flowchart illustrating a method for switching a wallpaper in the screen lock state according to an embodiment of the present invention. Referring to FIG. 1 and FIG. 2, first, in step 210, the mobile electronic device 100 is switched to the screen lock state via the screen lock state switching module 120.

Next, in step 220, the input signal generated when the user touches the touch screen 110 is received. Next, in step 230, the processing module 130 first judges whether or not the input signal is located in the specific area of the touch screen 110. In the present embodiment, the specific area is for example a wallpaper displaying area on the touch screen 110, which is used for displaying the wallpapers. Namely, in the step 230, the processing module 130 judges whether or not a touch position of the user is located in the wallpaper displaying area.

If the input signal is located in the specific area (for example, the wallpaper displaying area), in step 240, the processing module 130 then detects the moving track of the input signal, so as to switch the wallpaper of the screen lock state according to the moving track. In detail, in step 250, the processing module 130 obtains a moving direction of the moving track, and in step 260, the candidate wallpapers stored in the storage unit 140 are sequentially switched and displayed on the touch screen 110 according to the moving direction of the moving track, so as to switch the wallpaper.

In the following content, how the processing module 130 switches the wallpaper on the touch screen 110 is described in detail. First, the processing module 130 displays a plane (referred to as a first plane hereinafter) of a 3D motion user interface on the touch screen 110. In the present embodiment, the 3D motion user interface may be a polyhedron or a cube, which is not limited by the present invention. One of the candidate wallpapers (referred to as a candidate wallpaper A hereinafter) stored in the storage unit 140 is displayed on the first plane.

Next, the processing module 130 selects a candidate wallpaper (referred to as a candidate wallpaper B hereinafter) next to the candidate wallpaper A according to the sequence of the candidate wallpapers arranged based on the picture information thereof, and displays the candidate wallpaper B on another plane (referred to as a second plane hereinafter) of the 3D motion user interface. Wherein, the first plane and the second plane of the 3D are tow adjacent planes on the motion user interface.

Figure 3:
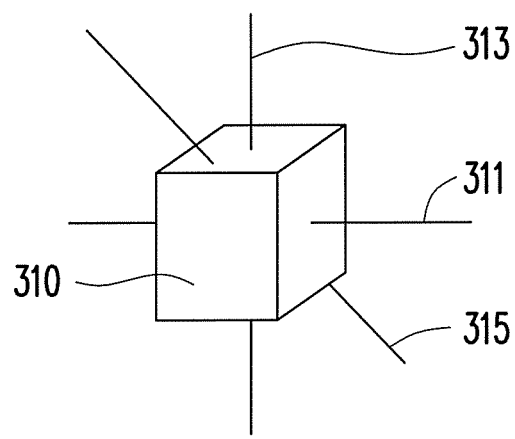
FIG. 3 is a schematic diagram illustrating a 3D motion user interface according to an embodiment of the present invention.

Finally, the processing module 130 processes an axial rotation on the 3D motion user interface to axially rotate according to the moving direction of the moving track, so as to switch the first plane to the second plane. Taking a 3D motion user interface 310 of FIG. 3 as an example, the 3D motion user interface 310 is axially rotated under control of the processing module 130 along an X axis 311, a Y axis 313 or a slanted axis 315 according to the moving direction. Therefore, when the first plane is switched to the second plane by the processing module 130, the user may observe that the wallpaper of the screen lock state is changed from the candidate wallpaper A to the candidate wallpaper B.

Moreover, after the processing module 130 switches the wallpaper of the screen lock state, a present time is further displayed at a time displaying area of the touch screen 110, so that the user may still observe the present time in the screen lock state. Wherein, the time displaying area partially covers the wallpaper displaying area.

Figure 4:
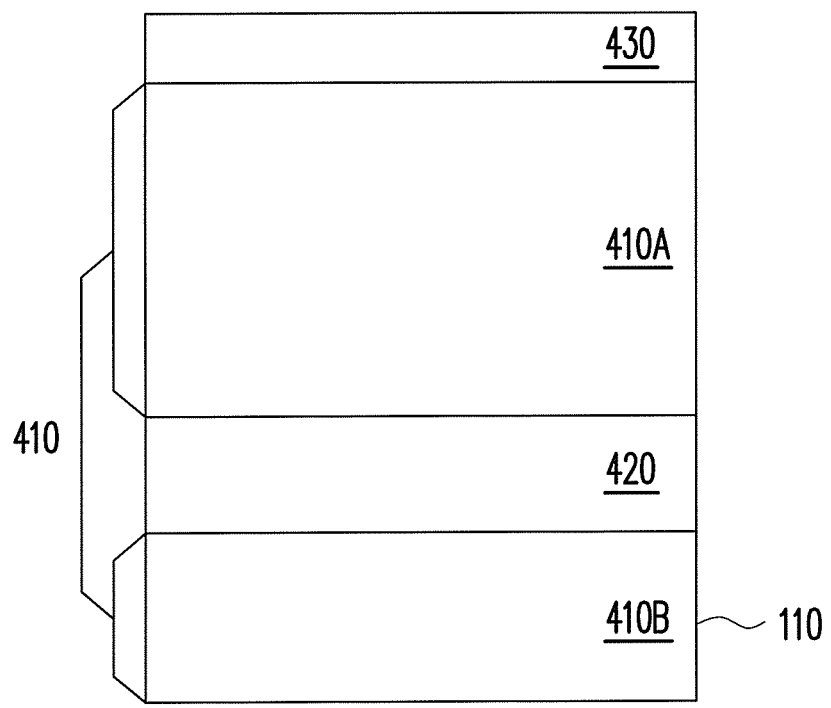
FIG. 4 is a schematic diagram of a touch screen according to an embodiment of the present invention.

FIG. 4 is a schematic diagram illustrating the touch screen 110 of the mobile electronic device 100. Referring to FIG. 4, in the present embodiment, the touch screen 110 of the mobile electronic device 100 includes a wallpaper displaying area 410, a time displaying area 420 and a device information displaying area 430. The wallpaper displaying area 410 is used for displaying the wallpaper of the screen lock state. The time displaying area 420 is used for displaying the present time or date. The device information displaying area 430 is used for displaying various information of the mobile electronic device such as battery volume, signal intensity or melody mode, etc.

In the present embodiment, the time displaying area 420 covers the wallpaper displaying area 410 and divides the wallpaper displaying area 410 into an area 410A and an area 410B. Therefore, after the mobile electronic device 100 enters the screen lock state, as long as the user touches the wallpaper displaying area 410A or the wallpaper displaying area 410B, the processing module 130 then detects the moving track of the input signal to obtain the corresponding moving direction, and switches and displays different candidate wallpapers according to the arranged sequence of the candidate wallpapers stored in the storage unit 140, so as to switch the wallpaper. Meanwhile, the processing module 130 also displays the present time on the time displaying area 420.

It should be noted that the method for switching wallpaper in the screen lock state may be applied to any mobile electronic device having a processor. In other words, the method of the aforementioned embodiment may be designed as a computer program including a plurality of the program codes, and the computer program may be stored in a storage medium (such as an optical disc, a floppy disk, or a removable disk, etc.). After the computer program is loaded to the mobile electronic device, the aforementioned method for switching wallpaper in the screen lock state then may be executed in the mobile electronic device.

In summary, according to the method for switching wallpaper in the screen lock state, the mobile electronic device thereof, and the storage medium thereof of the present invention, a plurality of the candidate wallpapers arranged in a sequence based on picture information thereof is first predetermined. Then, after the mobile electronic device enters the screen lock state, the candidate wallpapers are sequentially switched and displayed on the touch screen according to the position, the moving track and the moving direction of the input signal, so as to switch the wallpaper of the screen lock state. As a result, the user can switch wallpaper arbitrarily without switching the mobile electronic device back to an operation state, so that operation convenience is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for switching wallpaper in a screen lock state, comprising:

displaying a first wallpaper on a touch screen of a mobile electronic device in the screen lock state;

receiving a sliding operation via the touch screen in the screen lock state;

determining whether the sliding operation is located in a specific area; and switching from the first wallpaper to a second wallpaper based on a determination that the sliding operation is located in the specific area, comprising:

obtaining a moving direction of the sliding operation based on the determination that the sliding operation is located in the specific area; and switching from the first wallpaper to the second wallpaper in a direction corresponding to the obtained moving direction of the sliding operation, without switching the mobile electronic device out of the screen lock state and into an operation state;

wherein the first wallpaper and the second wallpaper are each one of a plurality of candidate wallpapers pre-arranged in a sequence based on picture information of the candidate wallpapers;

wherein the picture information includes at least one of picture size, filing time of the picture, and picture name; and wherein the first wallpaper and the second wallpaper are switched in a sequence according to at least one of the picture size, the filing time of the picture, and the picture name.

2. The method for switching wallpaper in the screen lock state as claimed in claim 1, wherein the specific area comprises a wallpaper displaying area of the touch screen.

3. The method for switching wallpaper in the screen lock state as claimed in claim 2, wherein after switching from the first wallpaper to the second wallpaper based on the determination that the sliding operation is located in the specific area, the method further comprises:
  displaying a present time in a time displaying area on the touch screen, wherein the time displaying area partially covers the wallpaper displaying area.

4. The method for switching wallpaper in a screen lock state as claimed in claim 1, wherein the step of switching the first wallpaper and the second wallpaper in the sequence according to the picture information comprises:
  displaying a first plane of a 3D motion user interface on the touch screen, wherein the first plane displays the first wallpaper;
  displaying the second wallpaper on a second plane of the 3D motion user interface according to the sequence of the first wallpaper and the second wallpaper arranged based on the picture information, wherein the first plane and the second plane are two adjacent planes of the 3D motion user interface; and
  processing an axial rotation on the 3D motion user interface according to the moving direction, so as to switch the first plane to the second plane.

5. The method for switching wallpaper in the screen lock state as claimed in claim 4, wherein the 3D motion user interface comprises a polyhedron.

6. The method for switching wallpaper in the screen lock state as claimed in claim 4, wherein the 3D motion user interface comprises a cube.

7. The method for switching wallpaper in the screen lock state as claimed in claim 4, wherein the axial rotation at least comprises one of a rotation along an X axis, a rotation along a Y axis and a rotation along a slanted axis.

8. The method for switching wallpaper in the screen lock state as claimed in claim 1, wherein if a moving track of the sliding operation is within the specific area, the sliding operation is determined to be located in the specific area, and if the moving track of the sliding operation is not within the specific area, the sliding operation is not determined to be located in the specific area.

9. A mobile electronic device, comprising:
  a screen lock state switching module, for switching the mobile electronic device to a screen lock state;
  a touch screen, coupled to the screen lock state switching module, for receiving a sliding operation in the screen lock state; and
  a processing module, coupled to the touch screen, for:
    displaying a first wallpaper on the touch screen in the screen lock state,
    determining whether the sliding operation is located in a specific area, and
    switching from the first wallpaper to a second wallpaper based on a determination that the sliding operation is located in the specific area, comprising:
      obtaining a moving direction of the sliding operation based on the determination that the sliding operation is located in the specific area, and
      switching from the first wallpaper to the second wallpaper in a direction corresponding to the obtained moving direction of the sliding operation, without switching the mobile electronic device out of the screen lock state and into an operation state,
    wherein the first wallpaper and the second wallpaper are each one of a plurality of candidate wallpapers pre-arranged in a sequence based on picture information of the candidate wallpapers,
    wherein the picture information includes at least one of picture size, filing time of the picture and picture name, and
    wherein the first wallpaper and the second wallpaper are switched in a sequence according to at least one of the picture size, the filing time of the picture, and the picture name.

10. The mobile electronic device as claimed in claim 9, wherein the specific area comprises a wallpaper displaying area of the touch screen.

11. The mobile electronic device as claimed in claim 10, wherein the processing module is used for displaying a present time in a time displaying area on the touch screen, wherein the time displaying area partially covers the wallpaper displaying area.

12. The mobile electronic device as claimed in claim 9, wherein the processing module is used for displaying a first plane of a 3D motion user interface on the touch screen, the first plane displays the first wallpaper and used for displaying the second wallpaper on a second plane of the 3D motion user interface according to the sequence of first wallpaper and the second wallpaper arranged based on the picture information, and the first plane and the second plane are two adjacent planes of the 3D motion user interface and further used for processing an axial rotation on the 3D motion user interface according to the moving direction, so as to switch the first plane to the second plane.

13. The mobile electronic device as claimed in claim 12, wherein the 3D motion user interface comprises a polyhedron.

14. The mobile electronic device as claimed in claim 12, wherein the 3D motion user interface comprises a cube.

15. The mobile electronic device as claimed in claim 12, wherein the axial rotation at least comprises one of a rotation along an X axis, a rotation along a Y axis and a rotation along a slanted axis.

16. The mobile electronic device as claimed in claim 9, wherein if a moving track of the sliding operation is within the specific area, the processing module determines that the sliding operation is located in the specific area, and if the moving track of the sliding operation is not within the specific area, the processing module determines that the sliding operation is not located in the specific area.

17. A non-transitory storage medium, for storing a computer program including a plurality of program codes, the computer program being loaded to a mobile electronic device, so that the mobile electronic device executes a method for switching wallpaper in a screen lock state, the method comprising:
  entering the screen lock state;
  displaying a first wallpaper on a touch screen of the mobile electronic device in the screen lock state;
  receiving a sliding operation via the touch screen of the mobile electronic device;
  determining whether the sliding operation is located in a specific area; and
  switching from the first wallpaper to a second wallpaper according to a determination that the sliding operation is located in the specific area, comprising:
    obtaining a moving direction of the sliding operation based on the determination that the sliding operation is located in the specific area; and switching from the first wallpaper to the second wallpaper in a direction corresponding to the obtained moving direction of the sliding operation, without switching the mobile electronic device out of the screen lock state and into an operation state;

wherein the first wallpaper and the second wallpaper are each one of a plurality of candidate wallpapers pre-arranged in a sequence based on picture information of the candidate wallpapers;

wherein the picture information includes at least one of picture size, filing time of the picture and picture name; and wherein the first wallpaper and the second wallpaper are switched in a sequence according to at least one of the picture size, the filing time of the picture, and the picture name.

\* \* \* \* \*